United States Patent [19]
Angiulo et al.

[11] Patent Number: 6,044,387
[45] Date of Patent: Mar. 28, 2000

[54] SINGLE COMMAND EDITING OF MULTIPLE FILES

[75] Inventors: Michael Angiulo; Stuart B. Kolodner, both of Kirkland, Wash.

[73] Assignee: Microsoft Corporation, Redmond, Wash.

[21] Appl. No.: 08/926,747

[22] Filed: Sep. 10, 1997

[51] Int. Cl.[7] .................................................. G06F 17/30
[52] U.S. Cl. .......................... 707/533; 707/513; 707/515; 707/530; 707/531; 707/532; 707/536; 707/3; 707/5; 707/10; 707/102; 707/104
[58] Field of Search ........................... 707/3, 5, 10, 102, 707/104, 513, 515, 530, 531, 532, 533, 536; 704/8, 9; 400/63; 345/335, 340; 382/283

[56] References Cited

U.S. PATENT DOCUMENTS

| | | | |
|---|---|---|---|
| 5,705,502 | 1/1998 | Foley | 707/10 |
| 5,787,451 | 7/1998 | Mogilevsky | 707/533 |
| 5,802,530 | 9/1998 | Van Hoff | 707/513 |
| 5,870,559 | 2/1999 | Leshem | 709/224 |
| 5,913,185 | 6/1999 | Martino | 704/8 |

*Primary Examiner*—Thomas G. Black
*Assistant Examiner*—Diane D. Mizrahi
*Attorney, Agent, or Firm*—Ronald M. Anderson

[57] ABSTRACT

A spell check or a find and replace editing operation is implemented on a plurality of documents on a web and is initiated from a single dialog box. The user is provided the option of selecting either all documents on the web site or alternatively, specifying each of the plurality of documents on which the editing operation is applied. A summary review or list of documents is created by opening successive files on the web site and identifying those for which the selected editing operation is applicable. Once the summary review list of files is completed, the user has the option of reviewing one or more of the files on the list to control how the editing operation is completed. For example, in a spell check editing operation, a file reviewed by the user is opened to the first apparently misspelled word and the user is given the option of changing the word, ignoring it, or moving to the next apparently misspelled word, if any. This review process can selectively be deferred for one or more of the files in the list until a later time.

35 Claims, 5 Drawing Sheets

FIND OCCURRENCES OF "RESTART"

| STATUS | PAGE | COUNT |
|---|---|---|
| ● | Reviews (reviews.htm) | 1 |
| ● | Priorities (goals.htm) | 1 |
| ● | FrontPage 4 (index.htm) | 8 |
| ● | Pre-FP4 (pre-fp4.htm) | 1 |
| ● | FrontPage 4 Home (default.htm) | 210 |
| ● | Project (project.htm) | 1 |
| ● | Requests (requests.htm) | 1 |
| ● | Vision (vision.htm) | 1 |
| ● | Site Visits (sitevisits.htm) | 1 |
| ● | Training (training.htm) | 3 |
| ● | NewTasks (tasks.htm) | 1 |

FINISHED CHECKING PAGES.

FOUND 231 OCCURRENCES IN 11 PAGES

DONE — 64
EDIT PAGE — 66
ADD TASK — 68
HELP — 70
CLOSE — 72

SINGLE COMMAND EDITING OF MULTIPLE FILES

FIELD OF THE INVENTION

The present invention generally pertains to editing files, and more specifically, to editing a plurality of files at a site by specifying an operation that is applied to the files, with a single command.

BACKGROUND OF THE INVENTION

Word processing programs such as Microsoft Corporation's WORD FOR WINDOWS include the capability to automatically spell check an entire document so that each word appearing in the document is compared against words in a dictionary file provided with the word processing program. During the spell check operation, if a word is found in the document that is not spelled the same as any entry in the dictionary file, the word is tagged as being possibly misspelled. A spell check dialog box is then opened that suggests alternative spellings and gives the user the option to either correct the apparent misspelling, add the word to the dictionary, ignore the specified occurrence of the word, or ignore all occurrences of the word in the document. Even though multiple documents may be open in the word processing program, only one document, i.e., the document that currently has the focus, is spell checked in response to the user initiating the spell check feature. The prior art does not provide any mechanism for initiating the spell checking of multiple documents with a single command.

Another type of editing operation implemented in word processing programs is finding text or characters specified by the user and optionally replacing each occurrence thereof with alternative text or characters entered by the user in a dialog box. Various other options may be provided the user in carrying out this operation, including searching up or down from the current location of the cursor in the document, searching the whole document, matching the case of the text or characters specified, finding whole words or partial words, using pattern matching, looking for words that sound like the word entered, or finding all word forms, regardless of suffix. The user is enabled to review each occurrence of the text or characters that is found and decide whether to replace that occurrence, or alternatively, may elect to replace all occurrences in the document without any review. However, once again, prior art word processing programs only permit the user to perform a search and replace operation on the currently active document—not on a plurality of documents at one time.

The limitation of the prior art word processing programs in permitting editing operations on only one document at a time is not a substantial problem for simple word processing operations. But, the limitation is much more restrictive when a user needs to process a plurality of documents or files at one time. One area in which the need to perform such editing operations on multiple files with one command arises is in the administration of a web site. A web site often needs to be treated as a single entity, because of the interlinked nature of the web page documents comprising the site. Thus, it is preferable to treat the web site as a single document for purposes of spell checking web pages and for carrying out find and replace operations.

The ability to perform such editing operations across all of the web page documents comprising a web site is important for several reasons. A web site is often created by a group of people who are the authors of the various web pages comprising the web site. To achieve some degree in uniformity and to minimize differences in spelling and word usage, it would clearly be desirable to enable a web site administrator to edit a plurality of files so that they use similar spelling and apply common terminology conventions. Because the prior art only allows such editing operations to be performed on a single document at a time, the prior art options for carrying out this task would force the user to manually open each document on the web site to perform the desired editing operation. Clearly, this method is likely to be too time consuming if applied to several hundred documents. Furthermore, the prior art does not enable a web site administrator to keep track of the web pages on which misspellings are identified or on which a find and replace action is implemented, other than by manually creating a list of such documents.

From the foregoing discussion, it will be apparent that there has been a need to provide a tool that enables a plurality of files or documents to be edited with one command. Such a tool should be extremely useful in administering a web site and for other applications in which multiple files are preferably treated as a single document for purposes of efficiently implementing editing operations such as spell checking and find/replace.

SUMMARY OF THE INVENTION

In accord with the present invention, a method for effecting an automatic editing operation on a plurality of files at one time using a computer includes the step of enabling a user to specify the editing operation that is to be automatically effected on the plurality of files by the computer. Without requiring intervention by the user, the method automatically opens each of the files, if not already open, in order to identify any files for which the editing operation is applicable. The editing operation is then implemented on each file for which the editing operation is applicable.

The editing operation preferably comprises either the step of spell checking text included in the plurality of files to identify words that may be misspelled, or the step of finding characters specified by the user so that the characters can be replaced with replacement characters entered by the user.

A list that indicates the files for which the editing operation is applicable is temporarily created and presented to the user. Included in the list is an indication of the extent to which the editing operation is applicable to the files in the list, such as a count of the number of apparently misspelled words found in each file in the list. When presented with the list of the files, the user can either selectively effect the editing operation, or alternatively, defer the editing operation until a later time. Thus, the user is able to review the list and can selectively effect the editing operation for any of the files in the list. Any file that has been reviewed by the user can be selectively closed and the user can elect to open the next file in the list.

Furthermore, the method preferably includes the step of enabling the user to select the files included in the plurality of files. Only files that have been saved or are open are includable in the plurality of files.

If the editing operation comprises the step of finding and replacing characters, the method may include the step of enabling the user to select options that control the process. These options include finding only characters in each of the plurality of files that match a whole word specified by the user, and finding only characters in the plurality of files that match a case of the characters specified by the user.

Although other applications are contemplated for the present invention, the plurality of files may comprise web page documents for a web site.

Another aspect of the present invention is directed to a system for effecting an automatic editing operation on a plurality of files at one time. The system includes a memory in which a plurality of machine instructions are stored, a storage medium in which the plurality of files are stored, and a processor that is communicatively coupled to the memory and to the storage medium. The processor executes the machine instructions to implement functions generally consistent with the steps of the method discussed above.

Yet another aspect of the present invention is directed to an article of manufacture that includes a memory medium on which a plurality of machine instructions are stored. When executed by a computer, the machine instructions also carry out functions generally consistent with the steps of the above method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

An embodiment of the present invention has been incorporated into Microsoft Corporation's FRONTPAGE 97 software program, which is sold for installation and use on personal computers running WINDOWS 95 or WINDOWS NT operating systems. However, it is not in any way intended that the present invention be limited to this application, since it is contemplated that it could be distributed as a stand-alone program, or incorporated as a tool in many other types of applications for which editing operations on a plurality of files would be of benefit. Since the initial commercial embodiment of this invention is primarily directed to editing documents at a web site, the following description generally relates to that particular application. Yet, the invention is clearly applicable to many other applications and types of files.

The FRONTPAGE 97 software includes several tools that are used to create and modify webs and web pages, including a FRONTPAGE Explorer, a FRONTPAGE Editor, a ToDo List, and a plurality of wizards. The FRONTPAGE Explorer is a tool that is used for viewing and administering a web. When executed on a computer that functions as a client and which is coupled through a local area network or over the Internet to a web page server computer, this tool produces a graphical user interface display that contains both a hierarchical and graphical representation of a web site to help the user visualize the documents comprising the web site and their links while the web site is being built and maintained.

The FRONTPAGE Editor is a tool provided for creating, maintaining, and testing web pages. (As used in this disclosure, the terms "web page" or "page" are simply a type of document or file.) With the FRONTPAGE Editor, a user can insert images, create tables, links, bookmarks, hot spots, frames, and forms in web pages that incorporate hypertext markup language (HTML) code and display the results as they will appear to a person viewing the web page with a web browser. The ToDo List tool enables the user to create a list of tasks, such as those related to the maintenance or creation of a web site, which are required to be completed by a specific person. If multiple authors are creating or editing a web site, the ToDo List helps them keep track of which person is working on a specific web page and indicates the tasks assigned to each person. The ToDo List includes a name for each task, describes the task, indicates who is assigned to complete it, and provides a prioritization for the task. The significance of the ToDo List and of the FRONTPAGE Explorer and Editor in connection with the present invention is described below.

Generally, the present invention enables a user to invoke one of two different types of editing operations on a plurality of files by executing a single command. The generic term "editing operation" is applied throughout this disclosure and in the claims that follow to encompass checking for spelling errors, and finding occurrences of one or more specified words, phrases, or characters and selectively replacing each occurrence thereof in a document with one or more replacement words, phrases, or characters entered by the user. A find operation to identify each occurrence of a word, phrase, or characters entered by a user can also be implemented across multiple files on a web site, but is not considered an editing operation because it does not involve any change to the content of the files.

As noted above, the present invention is particularly useful in managing or administering documents for a web site, since such documents are often created or modified by different persons that tend to introduce inconsistency in terminology and spelling. To maintain uniformity among the documents accessed at a web site, it is therefore helpful for the administrator of the web site to be able to check for misspelled words in all of the documents using a single command. The Explorer tool in FRONTPAGE 97 includes a Tool menu item, with options for spell checking and for implementing a find/replace editing operation on a plurality of documents comprising a web site. These options are described below.

Spell Checking a Plurality of Files

Figure 3:
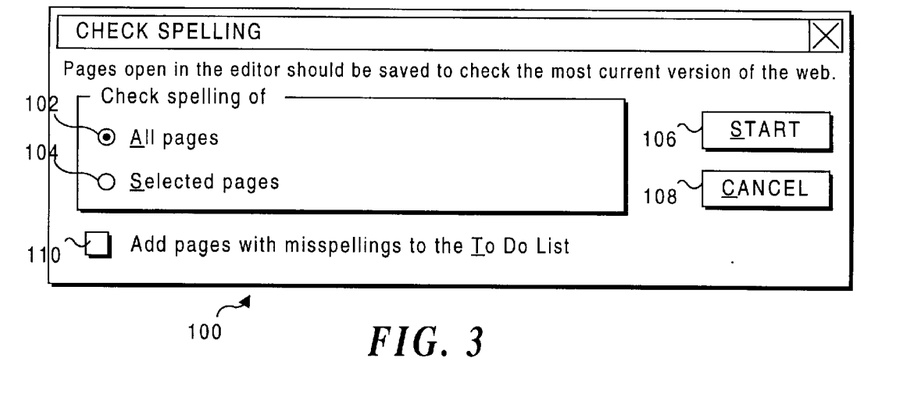
FIG. 3 is an exemplary dialog box used for initiating a spell check of a plurality of documents on a web site.

When the spell check option is selected, the program opens a dialog box 100 entitled "CHECKSPELLING," as shown in FIG. 3. The dialog box includes a warning to the user that pages open in the Editor should first be saved to ensure that the most current version of the document is checked. Thus, if a user is working on a document with the Editor tool and any modifications to the document have not yet been saved, these changes will not be checked for spelling errors. However, all documents comprising the web that have been saved will be checked, including those that are currently open. Also, when any spelling errors found in the documents on the web site are subsequently being reviewed, if a document in which one or more apparent spelling errors were found is already open, the open document can be reviewed by the user to determine the disposition of the apparent spelling error(s) identified. It is also contemplated that the present invention can readily be modified so that even those documents that are not yet saved but are open in the Editor (or some other application) may also be checked for spelling errors or be included the documents checked in a Find and Replace operation.

In dialog box 100, the user is presented with the option for checking the spelling of all pages on the web site by selecting a radio button 102, or of checking the spelling of only selected pages, by choosing a radio button 104. If the user selects the option to check all pages on the web, each document that has been saved (in this embodiment) will be checked for spelling errors. However, if the user chooses to check the spelling of only selected pages, the user will be presented with a hierarchical listing of the web page documents. It should be noted that as used in this context, the term "page" refers to a web page document or file.

When initiating the spell check editing operation, the user is also provided with an option in a check box 110 to add the task of reviewing pages that are appear to include one or more misspellings to the ToDo List. Choosing this option will cause the task of reviewing the list of documents that apparently include spelling errors to be inserted as an entry in the ToDo List so that the spelling errors can be reviewed by the user at a later time. Since a web site may include hundreds of such documents that must be spell checked, it may be useful to thus implement the spell checking process as a background task so that the list of pages or documents that apparently include spelling errors is generated overnight or during times when the client computer is not being used for other persons, so that the apparent spelling errors in the documents included in the list can be reviewed by the user at a later time.

Figure 4:
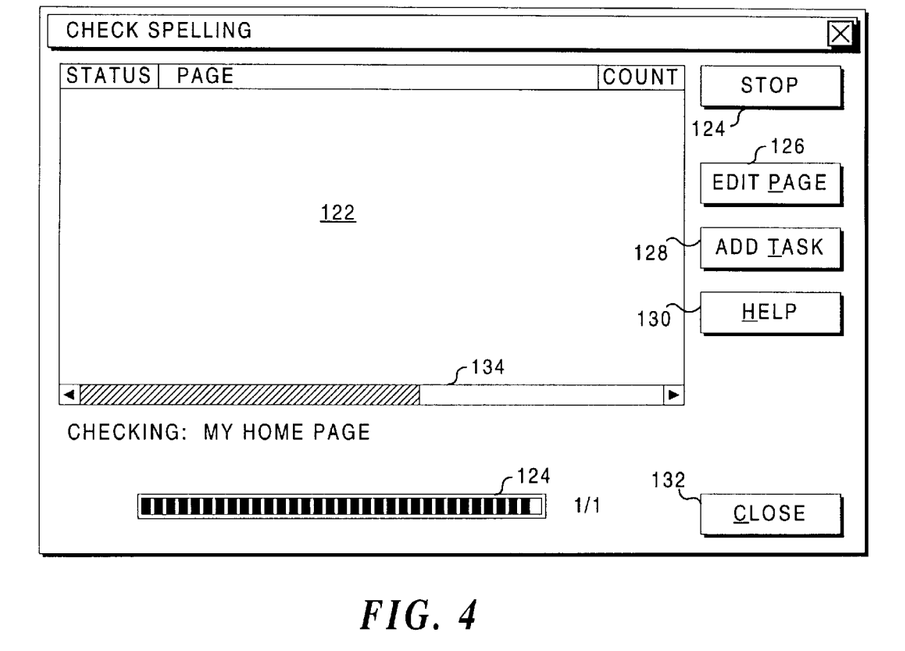
FIG. 4 is illustrates a dialog box in which a list of files is being created to identify files in which apparent spelling errors have been identified with the present invention.

In this embodiment, the find (and replace) and spell check editing operations are modal to the FRONTPAGE 97 Explorer. As a result, while implementing either of these editing operations, the FRONTPAGE 97 Explorer is disabled and unavailable for use. In contrast, the FRONTPAGE 97 Editor can be used while the spell checking editing operation is underway. While checking the spelling of the documents selected by the user, a progress indicator 124 (i.e., a bar graph) shows the status of the spell check operation as indicated in FIG. 4. In this example, only a single document, "MYHOMEPAGE," is being spell checked, as indicated by the "1/1" designation to the right of the progress indicator and by the title of the document shown the progress indicator. If 25 documents had been selected by the user for spell checking and the fifth document were being checked, progress indicator 124 would show the progress of spell checking the fifth document by varying the length of the bar graph and would indicate that the fifth of the 25 documents was being spell checked by including "5/25" to the right of the progress indicator. The title of the fifth document would be shown above the progress indicator. As each document is spell checked, any document in which a spelling error is found will be added to a list in a window 122.

Also included in the Check Spelling dialog box of FIG. 4 are a Stop button 124, an Edit Page button 126, which is usable once the list of documents with spelling errors has been completed, and an Add Task button 128 that enables the user to assign the review of spelling errors in one or more documents to a specific person by adding that review as a task on the ToDo List for implementation at a later time. In addition, a Help button 130, and a Close button 132 are included.

Figure 2:
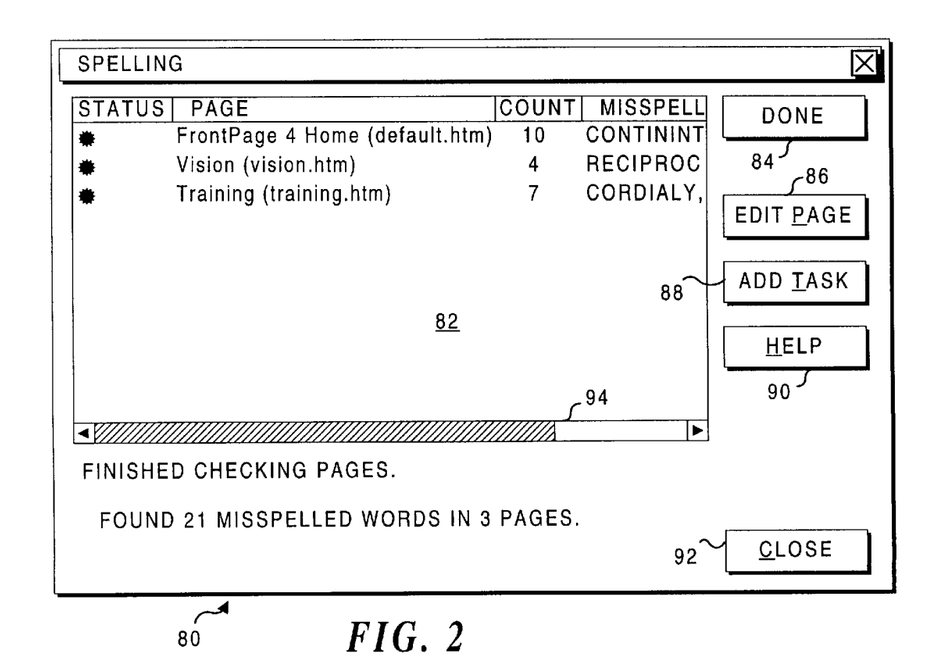
FIG. 2 is an exemplary dialog box listing documents that include apparently misspelled words identified by doing a spell check using the present invention.

If the user did not elect the option to add pages with misspellings to the ToDo List when initiating the spell check using check box 110 in dialog box 100 (as shown in FIG. 3), after all of the documents selected have been spell checked, the user will be presented with a list of documents that were been found to include apparent spelling errors as illustrated by the example in a dialog box 80 of FIG. 2. In this example, of all of the documents that were checked for spelling errors, 21 misspelled words were found in three of the documents. A window 82 lists the three documents by name under the "Page" heading and indicates that they have not yet been reviewed by including a mark under the "Status" column that is red in color. The "extent" of the editing operation for each file listed is indicated by including a column entitled "Count" that includes the total number of apparently misspelled words found in the document. To the far right, a Misspelled Words section identifies each of the misspelled words found in the documents listed in window 82. Most of the misspelled words are not initially visible in window 82 as shown in the example illustrated in FIG. 2, but can be accessed if the user moves scroll bar 94 toward the right, or resizes the dialog box so that more of the misspelled words are visible. The size of the dialog box is maintained from one edit operation to the next so that once the dialog box is enlarged, it will remain at that size to enable more words to be visible. Dialog box 80 includes a button 84 that can be selected to indicate that the user has finished reviewing the list of misspelled words, an Edit Page button 86, an Add Task button 88, and a Help button 90. In addition, a Close button 92 is provided to close dialog box 80.

The user can select any one of the documents listed in window 82 for review of the apparently misspelled words, causing the document to be opened at the first misspelled word, by selecting Edit Page button 86. Alternatively, the user can select one of more of the documents and add the task of reviewing the one or more documents and the apparently misspelled words found thereon to the ToDo List by selecting Add Task button 88. When a user edits the page that is included within the list of documents in which apparently misspelled words were found, each of the apparently misspelled words will be highlighted within the text at the point it appears in the document and the user will be given the opportunity to change the spelling of the word or to ignore it. Since some words will appear in documents that are not found in a spell check dictionary provided with the program or in a user dictionary generated by adding words that are not in the general dictionary, a word identified as misspelled may not be. If the user elects to add a word to the user dictionary, that word will be included with the words presumed to be correctly spelled in any future spell check editing operation. Alternatively, if the user elects to ignore the apparent misspelling of the word, no further action by the user is required and the next apparently misspelled word, if any, will be highlighted in the document.

Figure 5:
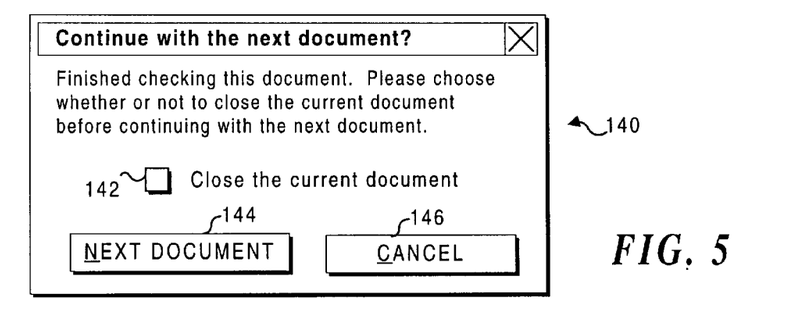
FIG. 5 is an exemplary dialog box that provides a user the option to review the next document in a list of documents.

After reviewing all of the apparently misspelled words in a document, the option to review the next document in the list is provided. If the user elects to check the next document, it is automatically opened in the editor at the point where the first apparently misspelled word has been identified. FIG. 5 illustrates a dialog box 140 that is presented to the user after all misspelled words in a given document have been reviewed by the user and selected action taken. In dialog box 140, a check box 142 can be selected by the user to close the current document. In addition, the user is presented with control buttons 144 and 146. Control button 144, if selected, opens the next document in the list for review of the apparently misspelled word(s) contained therein. Alternatively, if the user selects control button 146, the current editing operation is cancelled, returning the user to the list of files with apparently misspelled words.

Figure 6:
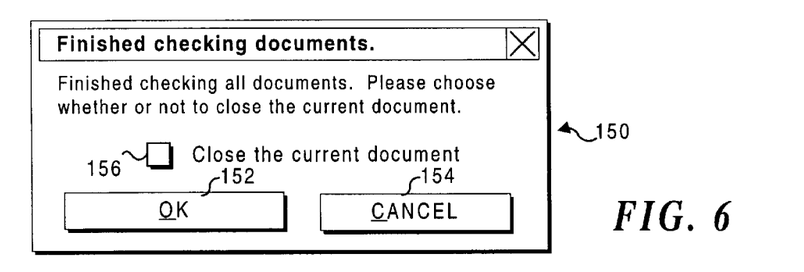
FIG. 6 is an exemplary dialog box that enables a user to close and exit from the review of a last document in a list of documents.

Assuming that the user selects control button 144 in FIG. 5, the next document with apparently misspelled words is opened for review, as described above. After the user completes the review of all of the documents in the list in which apparently misspelled words have been found, the user is presented with a dialog box 150, as shown in FIG. 6. In this dialog box, a check box 156 again is provided for enabling the user to selectively close the current document. An OK button 152 and a Cancel button 154 can be selected to complete or cancel the operation, respectively.

Find Operation

Figure 7:
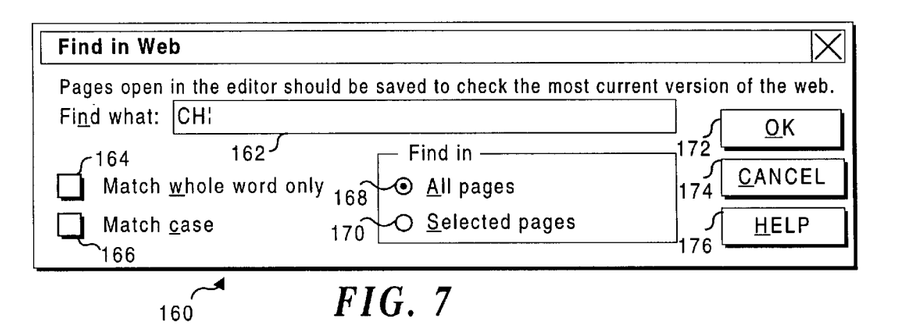
FIG. 7 is an exemplary dialog box used for initiating a find editing operation in accord with the present invention.

While not an editing operation, since no change is made in a document on which it is performed, provision is made in FRONTPAGE 97 Explorer for finding a word, a phrase, or character specified by the user among the documents on the web site. FIG. 7 shows a dialog box 160 that is open in response to the user selecting the Find option in the Tool menu of FRONTPAGE 97 Explorer. This dialog box includes a text box 162 for entry of one or more word, phrases, or characters specified by the user to be found in the documents. In dialog box 160, several options are available that are applied if selected when finding the specified characters entered in text box 162. A check box 164 can be selected if the user wishes to match a whole word that has been entered in text box 162. Further, the user can choose to match the case of the word entered in text box 162 by selecting a check box 166. Radio button 168 and 170 are provided to respectively enable the user to find the text entered in text box 162 either by searching all pages or only selected pages. Again, if the user chooses to search only selected pages, the specific pages that will be searched must be selected by the user from the displayed documents provided in FRONTPAGE 97 Explorer, using the mouse.

Buttons 172, 174, and 176 respectively provide the option for proceeding by selecting OK, canceling the operation, or requesting help.

Figure 1:
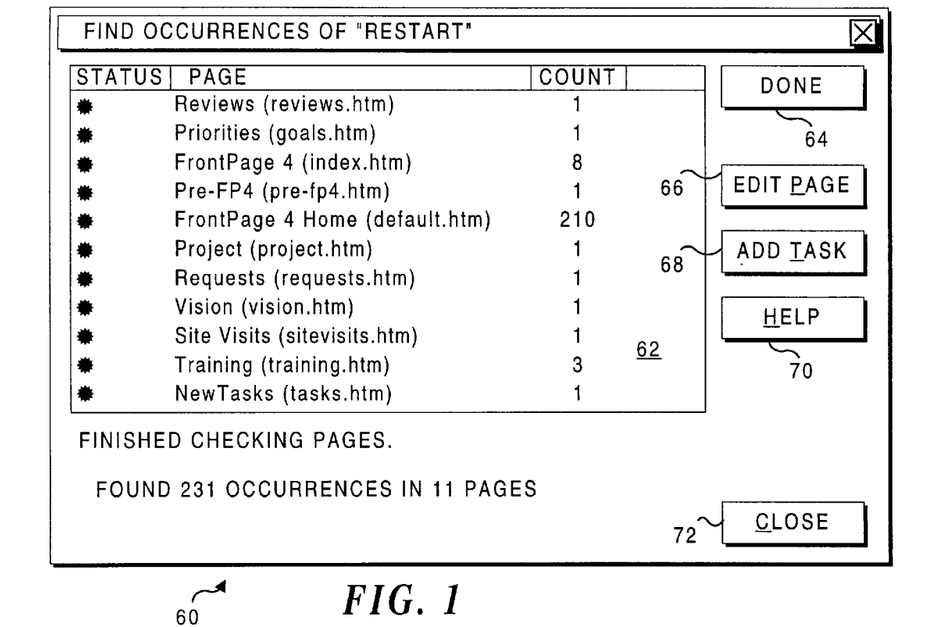
FIG. 1 is an exemplary dialog box listing documents that include specified text, and which have been found using an embodiment of the present invention.

FIG. 1 illustrates a dialog box 60 in which eleven pages or documents are listed in a window 62 as a result of implementing a request to find each occurrence of the word "restart." Each document in which this word was found is listed next to a marker colored red (in this embodiment) to indicate the status of the document, i.e., indicating that the documents have not been reviewed. Again, the user is given the option of reviewing a select document in the list (to display each occurrence of the word found in the document) by simply pushing a button 66.

Alternatively, a button 68 can be pressed to add the task of reviewing any one or more of the listed documents to the ToDo List. A button 64 labeled "Done" is selected to indicate that the user has finished reviewing the list, while a button 72 closes the dialog box. In addition, a Help button 70 can be pressed to obtain assistance with any aspect of the review process. Window 62 also lists the number of occurrences of the word that was found in the document under a column heading "Count."

Find and Replace Editing Operation

Figure 8:
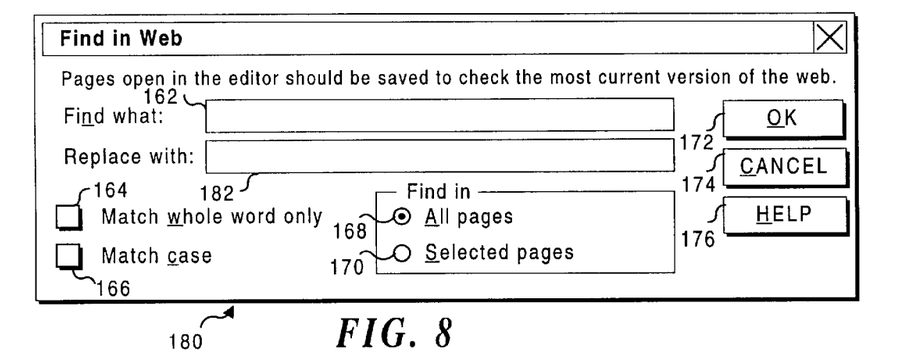
FIG. 8 is an exemplary dialog box used for initiating a find and replace operation in accord with the present invention.

One or more characters (or words or phrases) specified by the user can be found in multiple documents on the web site and replaced with one or more characters (or words or phrases) entered by the user by selecting this Find/Replace option under the Tool menu of FRONTPAGE 97 Explorer. In FIG. 8, dialog box 180 enables a user to enter the specified characters in text box 162, just as in the find operation. However, dialog box 180 also includes a text box 182 in which the user can enter characters to replace the characters specified in text box 162. The same options are provided to the user as in the find operation, including check boxes 164 and 166, enabling the user to match only a whole word that is entered, and/or to match the case of the characters that were specified in text box 162. Also, the user has the option of finding the text and replacing it either in all of the documents on the web site or only in selected documents, as determined by the choice of radio button 168 or 170. Once the specified characters are entered in text box 162, the characters that will replace the specified characters are entered in text box 182, and the required options have been selected, the user initiates the find and replace operation by clicking on OK—button 172. The operation can be canceled by clicking on Cancel—button 174. Or, help can be obtained by clicking on Help button 176.

After the find and replace operation is initiated, the program opens each of the documents that the user selected to be searched for the text that was specified and produces a list much like that shown in FIG. 1 in which each document containing the characters specified by the user is found. Again, the status column includes a symbol indicating whether the documents in the list have been reviewed or added to a ToDo List as a task. In this embodiment, the symbol in the status column is colored red until the document adjacent the symbol has been either reviewed, or a decision has been made to defer the editing by adding the document as a task to a ToDo List. Once the document is reviewed, the status symbol changes from red to yellow and the word "Edited" appears next to the symbol. Similarly, if the review of the document is deferred by placing it on a ToDo List, the symbol changes to a yellow color and the text "Added Task" appears next to the symbol. These same changes in the indicated status of a document described above also occur in connection with a spell check editing operation, i.e., once a user has reviewed the indicated errors in a document or deferred the review by creating a task on the ToDo List, the status symbol changes color and the appropriate text is applied in the status column.

If the user selects a document for review by pressing control 66, the document is opened at the first instance where the characters specified by the user are found, and the user is given the option of replacing the specified characters with the replacement characters entered in text box 182 (FIG. 8) or skipping over that instance to the next point in the document where the specified characters are found, if any. In addition, the user is given the option of replacing all instances of the specified characters with the replacement characters entered by the user. When review of a document is completed, dialog box 140 opens, giving the user the option to close the current document and review the next document in the list. After the last document in the list has been reviewed, dialog box 150 gives the user the option for closing the current document and returning to the list.

Figure 9:
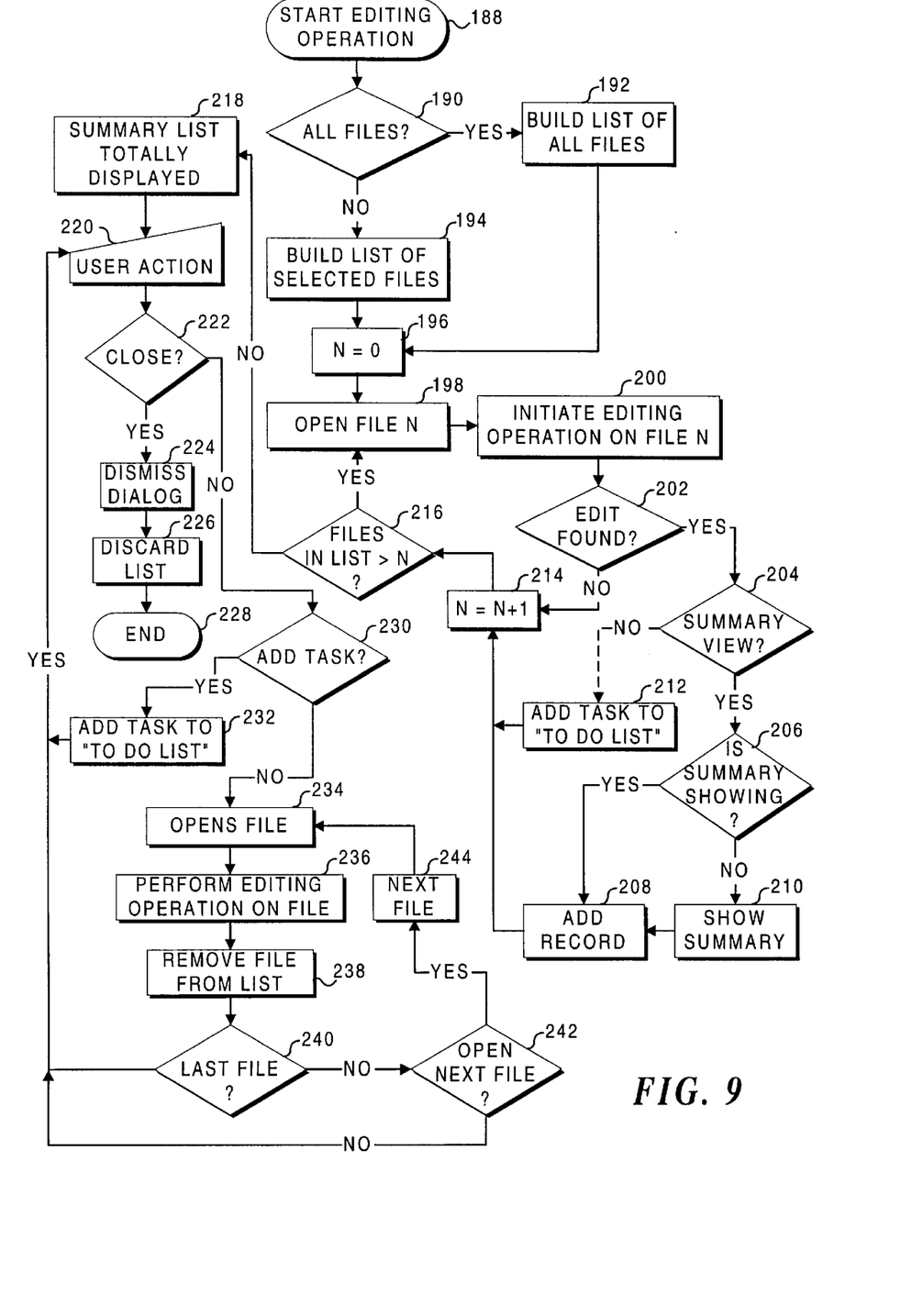
FIG. 9 is a flow chart of the logical steps implemented in carrying out the editing operation across a plurality of documents.

FIG. 9 illustrates the logic implemented when carrying out an editing operation in accordance with the present invention. This process begins when the user elects to start an editing operation, as indicated in a block 188. The editing operation can be either a spell check of documents or a find/replace operation. A decision block 190 determines if the user has elected to conduct the editing operation on all files on the web. It will be recalled that the user is presented with the option of checking a radio button to implement the editing operation either on all files or on selected files when initiating either the spell check or the find and replace editing operations. If the check all files option has been selected, a block 192 provides for building a list of all of the files on the web site. Conversely, if the user selects specific files for the editing operation, a block 194 builds a list of the selected files identified by the user. In either case, following either block 192 or block 194, the logic proceeds to a block 196 in which a counter or variable n is initialized to zero.

A block 198 begins opening the files in the list that was built in either block 192 or 194, beginning with file n. Initially, for n=0, the first file in the list is open and in a block 200, the program initiates the editing operation on file n. In a block 202, the program determines whether the editing operation selected by the user is applicable to file n. For example, if the user has elected to spell check the files in the list that was built, each word occurring in the current file that has been opened will be checked by comparing it against words in a dictionary to determine if any word can be identified that is apparently misspelled. Alternatively, and in a similar fashion, a find and replace editing operation would be implemented on the currently opened file to determine if any text matching the characters specified by the user is found in the file. If so, the logic proceeds to a decision block 204, which determines if the user has chosen to display the summary review or list of the tables to which the editing operation is applicable. It should be noted that if the user has elected to spell check the files and further, has chosen to defer the review of the files in which apparently misspelled words were found, the summary review list of files will not be shown. Instead, any currently opened file that is found applicable for the editing operation would be added to a ToDo List as an additional task, as noted in a block 212, and the user will be presented with a count of the number of files added to the ToDo List. While files are being checked for misspelled words in this mode, a status bar is displayed to show the progress. This option to defer review of the files is only available when doing spell checking in the embodiment included in FRONTPAGE 97. If the user is conducting a find and replace editing operation or has chosen not to defer processing of the files, an affirmative response to decision block 204 leads to a decision block 206. This decision block determines whether the summary review list of files is showing, and if so, a block 208 provides for adding the current file as an additional record in the summary list. A negative response to decision block 206 causes the summary review list to be displayed, and thereafter, the logic proceeds to block 208 to add the record to the summary review list. Following block 208 or block 212, a block 214 increments the counter n, and the logic proceeds to a decision block 216. In decision block 216, the program determines if the number of files in the list that was built in block 192 or block 194 is greater than n. If so, not all of the files in this list have been processed, and the logic proceeds to block 198 to open the next file in the list of files built in block 192 or in block 194.

After all of the files in the list that was built have been processed, the logic proceeds from decision block 216 to a block 218. In this block, the summary review list of all of the files for which the editing operation is applicable is totally displayed. It should be noted that a user can interrupt the loop from blocks 198 through 214 by pressing the stop button in the dialog box used to initiate the editing operation, and can then either proceed to block 218 and review the files that are displayed in the summary list or can resume the checking of the original list of files that was built in block 192 or block 194. A block 220 indicates that the user makes a selection that determines how the list of files will be handled. A decision block 222 determines if the user has selectively chosen to close the list of files. If so, a block 224 dismisses the dialog box in which the list of files is presented, and a block 226 discards the list as a temporary file that is no longer required. The process then terminates in a block 228.

However, if the user has not closed the process in decision block 222, a decision block 230 determines if the user has chosen to add the review of one or more files selected from the list as a task on the ToDo List. If so, a block 232 carries out this operation. However, if the user has instead chosen to review a file, the page or file is opened in a block 234. A block 236 provides for performing reviewing the results of the editing operation in the open document. In the case of spell checking, the user would be given the option of changing the spelling of an apparently misspelled word, skipping to the next apparently misspelled word, or ignoring the misspelled word. Once all of the misspelled words indicated in a file have been processed, the file or page is removed from the list of documents yet to be processed. Actually, this step is implemented simply by changing the status indicator of the file in the summary review list.

A decision block 240 determines if the last page or file has been processed and if not, proceeds to a decision block 242, which determines if the user has chosen to open the next file or page. If so, the logic proceeds to the next page in a block 244 and then loops back to block 234 to open the page. Conversely, if the user has not chosen to open the next page, the logic proceeds back to block 220 to consider further user actions or input. The same result occurs if the last page or file has been processed in decision block 240. Also, if the review or one or more selected files has been added as a task to the ToDo Fist, the logic also loops back to block 220 for further user action to be entered. Once the user has completed review of the files or has abandoned the project, the logic will flow through decision block 222 to block 228, which terminates the process.

Figure 10:
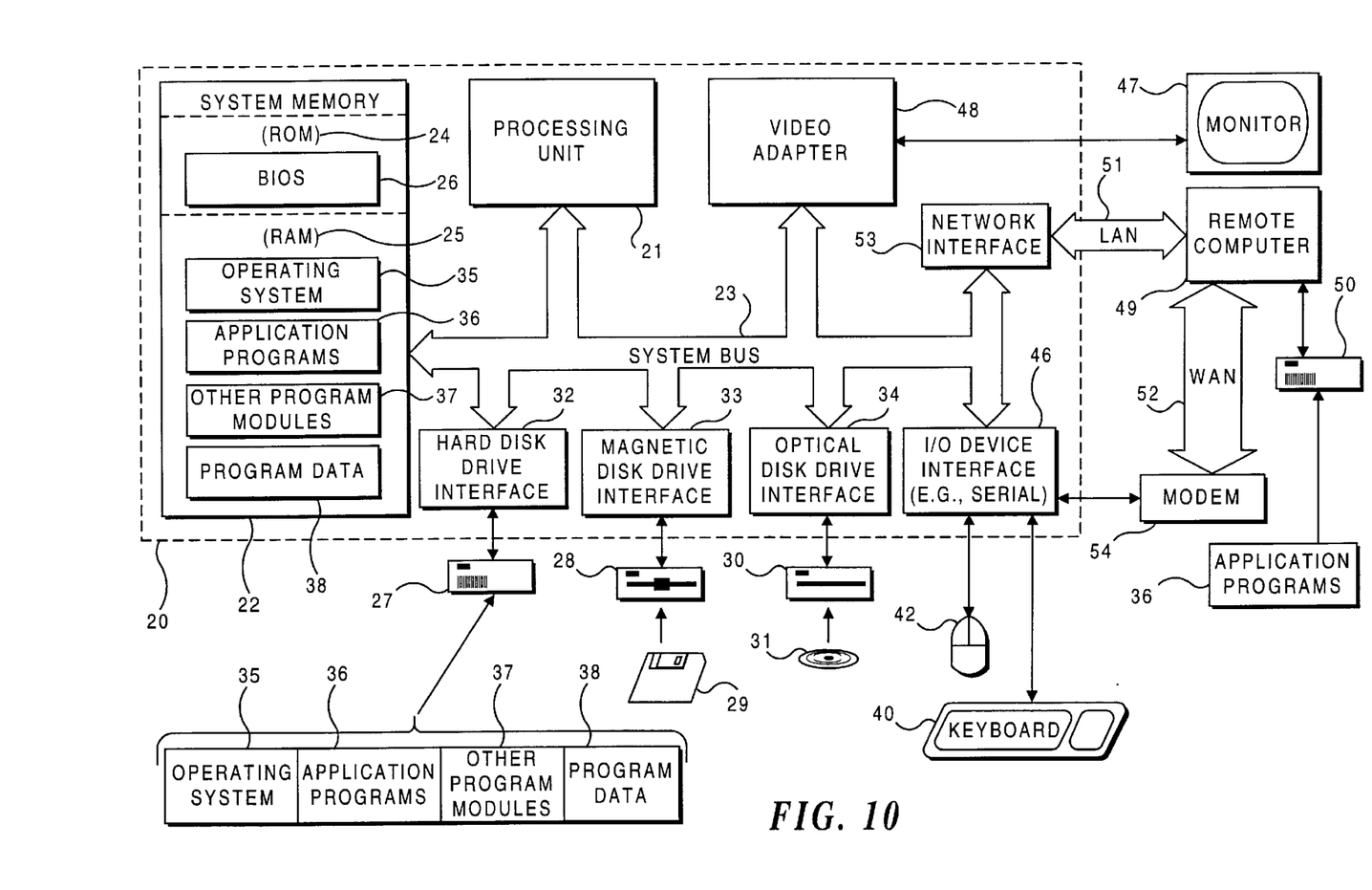
FIG. 10 is a schematic block diagram of a computer system suitable for implementing the present invention.

FIG. 10 and the following discussion are intended to provide a brief, general description of a suitable computing environment in which the present invention may be implemented. Although not required, the present invention is described in the general context of computer executable instructions, such as program modules, being executed by a personal computer. Generally, program modules include routines, programs, objects, components, data structures, etc. that perform particular tasks. Moreover, those skilled in the art will appreciate that this invention may be practiced with other computer system configurations, including handheld devices, multiprocessor systems, microprocessor based or programmable consumer electronic devices, network personal computers, minicomputers, mainframe computers, and the like. In connection with the embodiment implemented in FRONTPAGE 97, the invention will likely be practiced in distributed computing environments where tasks are performed by remote processing devices that are linked through a communications network. In a distributed computing environment, program modules may be located in both local and remote memory storage devices.

With reference to FIG. 10, an exemplary system for implementing the invention includes a general purpose computing device in the form of a conventional personal computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further may includes a hard disk drive 27 for reading from and writing to a hard disk, not shown, and may include a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer readable machine instructions, data structures, program modules and other data for personal computer 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks, Bernoulli cartridges, RAM cards, ROM, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB), as appropriate for the external devices that are thus coupled to the personal computer. A monitor 47 or other type of display device is also connected to system bus 23 via an appropriate interface, such as a video adapter 48. In addition to the monitor, personal computers are often coupled to other peripheral output devices (not shown), such as speakers (through a sound card or other audio interface—not shown) and printers.

Personal computer 20 may operate in a networked environment using logical connections to one or more remote computers, such as a remote computer 49. Remote computer 49 may be another personal computer, a server, a router, a network personal computer, a peer device, or other common network node, and typically includes many or all of the elements described above in connection with personal computer 20, although only an external memory storage device 50 has been illustrated in FIG. 10. The logical connections depicted in FIG. 10 include a local area network (LAN) 51 and a wide area network (WAN) 52. Such networking environments are common in offices, enterprise-wide computer networks, intranets and the Internet.

When used in a LAN networking environment, personal computer 20 is connected to LAN 51 through a network interface or adapter 53. If used in a WAN networking environment, personal computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for effecting an automatic editing operation on a plurality of web page files at one time using a computer, comprising the steps of:
   (a) enabling a user to specify the editing operation that is to be automatically effected on the plurality of files by the computer;
   (b) without requiring intervention by the user, automatically opening each of the plurality of files, if not already open, in order to identify each file for which the editing operation is applicable; and
   (c) implementing the editing operation on each file for which the editing operation is applicable.

2. The method of claim 1, wherein the editing operation comprises one of the steps of:
   (a) spell checking text included in the plurality of files to identify words that may be misspelled; and
   (b) finding characters specified by the user and replacing said characters with replacement characters entered by the user.

3. The method of claim 1, further comprising the step of creating a list of files from the plurality of files, said list indicating the files for which the editing operation is applicable.

4. The method of claim 3, further comprising the steps of presenting the list of the files for which the editing operation is applicable to the user, and indicating an extent to which the editing operation is applicable to the files indicated in the list.

5. The method of claim 4, further comprising the step of enabling the user to selectively either effect the editing operation of a file indicated in the list of files when presented with the list, or alternatively, defer the editing operation of the file until a later time determined by the user.

6. The method of claim 3, further comprising the step of enabling the user to review the list and after effecting the editing operation of a file indicated in the list, selectively effecting the editing operation of a successive file indicated in the list.

7. The method of claim 6, further comprising the step of enabling the user to selectively close a current file that has been reviewed by the user to effect the editing operation.

8. The method of claim 1, further comprising the step of enabling the user to select files included in the plurality of files.

9. The method of claim 1, wherein only files that have been saved or are open are includable in the plurality of files.

10. The method of claim 2, wherein if the editing operation comprises the finding and replacing of characters, further comprising the step of enabling the user to select options related to the editing operation, said options including:
(a) finding only characters in each of the plurality of files that match a whole word specified by the user; and
(b) finding only characters in the plurality of files that match a case of the characters specified by the user.

11. The method of claim 1, wherein the plurality of files comprise web page documents for a web site.

12. A method for effecting one of a spell check, and a find and replace operation on a plurality of documents for a web site by a computer, comprising the steps of:
(a) enabling a user to selectively choose whether the spell check or the find and replace operation is to be effected on the plurality of documents, said user thereby selecting an editing operation to be performed on the plurality of documents;
(b) opening each of the plurality of documents, if not already open, to determine if the editing operation selected by the user is applicable to said document;
(c) producing a list of documents to which the editing operation is applicable;
(d) enabling the user to review the list of documents; and
(e) enabling the user to selectively effect the editing operation on any document indicated on the list.

13. The method of claim 12, further comprising the step of enabling the user to selectively defer the editing operation on any document until a later time.

14. The method of claim 13, further comprising the step of enabling the user to specify a person and a time to implement the editing operation of the document for which the editing operation is deferred.

15. The method of claim 13, further comprising the step of enabling the user to selectively implement the editing operation on a successive document on the list.

16. The method of claim 12, wherein only documents that are saved or are open are includable in the plurality of files.

17. The method of claim 12, further comprising the step of enabling the user to selectively choose documents from the web site for inclusion in the plurality of documents.

18. The method of claim 12, further comprising the steps of selectively producing the list of files as a background task; and, deferring the editing operation until a later time.

19. The method of claim 12, wherein while effecting the spell check of a document, the user is enabled to determine whether an apparently misspelled word is changed or left unchanged.

20. The method of claim 12, wherein the list includes a count indicating an extent of the editing operations identified in each document to which the editing operation is applicable.

21. The method of claim 12, wherein the plurality of files are stored on a server at a web site that is accessed over a network by the user using a client computer.

22. A system for effecting an automatic editing operation on a plurality of files at one time, comprising:
(a) a memory in which a plurality of machine instructions are stored;
(b) a storage medium in which the plurality of files are stored;
(c) a processor that is communicatively coupled to the memory and to the storage medium, said processor executing the machine instructions stored in the memory and in response thereto, performing a plurality of functions, including:
(i) enabling a user to specify the editing operation that is to be automatically effected on the plurality of files by the processor;
(ii) without requiring intervention by the user, automatically opening each file of the plurality of files on the storage medium in order to identify each file for which the editing operation is applicable; and
(iii) implementing the editing operation on each file for which the editing operation is applicable.

23. The system of claim 22, wherein the editing operation effected by the processor in response to the machine instructions comprises one of:
(a) spell checking text included in the plurality of files to identify words that may be misspelled; and
(b) finding characters specified by the user in the plurality of files and replacing said characters with replacement characters entered by the user.

24. The system of claim 22, wherein the processor, when executing the machine instructions, identifies files from those included in the plurality of files for which the editing operation is applicable and indicates the files that are identified in a list of files.

25. The system of claim 24, wherein the processor, when executing the machine instructions, presents the list of the files for which the editing operation is applicable to the user and indicates an extent to which the editing operation is applicable to the files indicated in the list.

26. The system of claim 25, wherein the processor, when executing the machine instructions, enables the user to selectively either effect the editing operation when presented with the list of the files, or alternatively, defer the editing operation until a later time determined by the user.

27. The system of claim 22, wherein the processor, when executing the machine instructions, enables the user to select files comprising the plurality of files.

28. The system of claim 22, wherein the plurality of files comprise web page documents for a web site.

29. An article of manufacturer adapted to used with a computer for effecting an automatic editing operation on a plurality of web page files at one time, comprising:
(a) a memory medium;
(b) a plurality of machine instructions stored on the memory medium, said machine instructions, when executed on the computer, causing the computer to:
(i) enable a user to specify the editing operation that is to be automatically effected on the plurality of files;
(ii) without requiring intervention by the user, automatically open each file of the plurality of files, if not already open, in order to identify each file for which the editing operation is applicable; and
(iii) implement the editing operation on each file for which the editing operation is applicable.

30. The article of manufacture of claim 29, wherein the editing operation implemented by the machine instructions comprises one of:
(a) spell checking text included in the plurality of files to identify words that may be misspelled; and
(b) finding characters specified by the user in the plurality of files and replacing said characters with replacement characters entered by the user.

31. The article of manufacture of claim 29, wherein the machine instructions cause the computer to create a list of files by identifying any file from the plurality of files for which the editing operation is applicable and adding the file to said list of files.

32. The article of manufacture of claim 31, wherein the machine instructions cause the list of the files for which the editing operation is applicable to be presented to the user, said list indicating an extent to which the editing operation is applicable to the files in the list.

33. The article of manufacture of claim 29, wherein the machine instructions cause the computer to enable the user to either selectively effect the editing operation when presented with the list of the files, or alternatively, defer the editing operation until a later time determined by the user.

34. The article of manufacture of claim 29, wherein the machine instructions cause the computer to enable the user to select files included in the plurality of files.

35. The article of manufacture of claim 29, wherein the plurality of files comprise web page documents for a web site.

* * * * *